(12) United States Patent
Enoki et al.

(10) Patent No.: US 6,245,224 B1
(45) Date of Patent: Jun. 12, 2001

(54) WATER QUALITY MANAGEMENT SYSTEM

(75) Inventors: Hideo Enoki, Ibaraki-ken; Sadao Mori, Tsuchiura; Masao Fukunaga; Tamio Ishihara, both of Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/397,733

(22) Filed: Sep. 17, 1999

(30) Foreign Application Priority Data

Sep. 17, 1998 (JP) .................................................. 10-262707

(51) Int. Cl.⁷ .................................................. B01D 17/12
(52) U.S. Cl. ........................... 210/87; 73/64.55; 73/863; 137/93; 210/93; 210/96.1; 210/97; 210/433.1; 210/541
(58) Field of Search .................................. 210/85, 94, 97, 210/96.1, 143, 257.1, 96.2, 739, 754, 433.1, 921, 87, 138; 216/2, 56; 422/68.1, 70, 82.05; 436/39, 67, 177, 80; 73/53.01, 64.55, 64.56, 863, 863.01, 863.02, 863.23, 863.31; 137/3, 5, 43

(56) References Cited

U.S. PATENT DOCUMENTS

| 5,160,604 | * | 11/1992 | Nakamura et al. ..................... 210/85 |
| 5,172,332 | * | 12/1992 | Hungerford et al. .............. 73/863.01 |
| 5,304,487 | * | 4/1994 | Wilding et al. ....................... 436/164 |
| 5,646,863 | * | 7/1997 | Morton ................................... 210/85 |
| 5,821,405 | * | 10/1998 | Dickey et al. ....................... 73/53.01 |
| 5,824,270 | * | 10/1998 | Rao .................................... 422/82.05 |
| 5,869,004 | * | 2/1999 | Parce et al. ............................ 73/863 |

FOREIGN PATENT DOCUMENTS

| 54-124789 | * | 9/1979 | (JP) . |
| 6-320166 | | 11/1994 | (JP) . |
| 7-290040 | | 11/1995 | (JP) . |
| 197712 | * | 12/1977 | (SU) . |

OTHER PUBLICATIONS

Journal of the Society of Instrumen and Control Engineers, vol. 33, No. 8, Aug. 1994.*

* cited by examiner

*Primary Examiner*—Joseph W. Drodge
(74) *Attorney, Agent, or Firm*—Evenson, McKeown, Edwards & Lenahan, P.L.L.C.

(57) ABSTRACT

A water quality management system for managing the water quality in a water supply network having water pipe lines running from the purification plant to consumers' faucets to maintain the water quality at the consumers at the terminals of the network at an appropriate level. The water quality monitors for measuring the quality of water in the pipe lines are installed in the small-pipe water distribution network branching from the water distribution main pipe network and running toward the consumers. The water distribution facility for improving the water quality is installed at the base point of the small-pipe water distribution network. The water quality in the small-pipe water distribution network is managed based on the signals from the water quality monitors.

7 Claims, 5 Drawing Sheets

FIG.1

◯ AREA COVERED BY SMALL-PIPE
WATER DISTRIBUTION NETWORK 31

FIG.9

WATER QUALITY MANAGEMENT SYSTEM

BACKGROUND OF THE INVENTION

The present invention relates to a water quality management system and more particularly to measurement, monitoring and management of water quality at the end of pipe lines.

Management is made of water by filtering and disinfecting the water from a drainage basin in a purification plant and then distributing only the water that has passed water quality criteria to consumers. Among criteria for evaluating the quality of tap water are residual chlorine (for example, in Japan, 0.1 mg/L or higher for water at taps; 0.4 mg/L or less for tasty water), turbidity (2 degrees or less) and color (5 degrees or less). A conventional practice for maintaining the quality of water involves sampling water from parts of the water distribution pipe line network and checking residual chlorine concentration, turbidity and color manually or by a water monitoring apparatus to determine the amount of chlorine to be added to the water. As described in JP-A-6-320166, another conventional method of controlling the amount of chlorine to be added at the purification plant involves performing fuzzy reasoning based on signals from water quality monitors installed in the water distribution pipe line network and on measured amounts of residual chlorine in a clean water reservoir and a water distribution reservoir at the purification plant to minimize the amount of trihalomethanes. Further, as described in JP-A-7-290040, still another method performs analysis on the water distribution pipe line network to determine the flow and head of the water flowing past nodes (intersections) in the pipe line network and the amount of water taken out at respective nodes and thereby estimate the amount of residual chlorine at each node to adjust the amount of chlorine to be added into the distribution reservoirs provided at the purification plant and in the pipe line network.

The water is supplied from the purification plant to consumers through a distribution main 400 mm or more in diameter which branches into smaller distribution pipes 100–350 mm in diameter. The water in the distribution pipes is required to have residual chlorine concentrations higher than a certain level to prevent multiplication of bacteria. The amount of chlorine in the water decreases exponentially over time due to reaction with organic matters in the water and with pipe walls, and there are variations in the chlorine concentration depending on the route of water supply and the time taken by the water to reach faucets. The rate of reduction in the residual chlorine is affected by the pipe diameter, the presence or absence of lining inside the pipe, and the temperature of water. The chlorine reduction rate is higher in a smaller-pipe distribution network because the reduction rate increases as the pipe diameter decreases and the water temperature becomes high. The time it takes for the water to reach the faucets varies daily and by seasons depending not only on the amount of water used at the faucets but also on the amount of water used downstream. Further, turbidity and color variations are caused by rust due to deteriorated piping and soil particles entering into water through damaged pipes.

Since it is practically impossible to grasp by analysis the state of the small-pipe water distribution network near the consumers beyond the main pipe line branches as well as the water flow in a whole water supply network from the purification plant to the consumers, the control of water quality at the consumers' end of the water supply network is almost impossible.

SUMMARY OF THE INVENTION

An object of the present invention is to provide a water quality management system which can grasp the state of the small-pipe water distribution network near the consumers beyond the main pipe line branches as well as the water flow in a whole water supply network from the purification plant to the consumers to maintain at an appropriate level the water quality at the consumers' end of the water supply network.

A first feature of the present invention to achieve the above objective is a water quality management system for managing the quality of water in a water supply network having water pipe lines running from a purification plant to consumers' faucet, comprising: water quality monitors installed in a small-pipe water distribution network to measure the quality of water in pipe lines, the small-pipe water distribution network branching from a water distribution main and running toward the consumers; wherein the quality of water flowing from the water distribution main to the small-pipe water distribution network is controlled based on signals from the water quality monitors.

A second feature of the invention is a water quality management system comprising: a water quality supervision center for supervising and controlling the quality of water flowing into a small-pipe water distribution network on the consumers' side which branches from a water distribution main; and water quality monitors to measure the quality of water in pipe lines of the small-pipe water distribution network; wherein signals from the water quality monitors are transmitted to the water quality supervision center to control the quality of water flowing from the water distribution main to the small-pipe water distribution network.

A third feature of the invention is a water quality management system comprising: a water distribution facility installed at a base point of a small-pipe water distribution network to improve the water quality, the small-pipe water distribution network branching from a water distribution main and running toward the consumers; and water quality monitors installed in the small-pipe water distribution network to measure the quality of water; wherein the quality of water flowing from the water distribution facility to the small-pipe water distribution network is controlled based on signals from the water quality monitors.

A fourth feature of the invention is a water quality management system comprising: a water distribution facility installed at a base point of a small-pipe water distribution network to improve the water quality, the small-pipe water distribution network branching from a water distribution main and running toward the consumers; water quality monitors installed in the small-pipe water distribution network to measure the quality of water; and flow sensors to measure the flow of water running through pipe lines of the small-pipe water distribution network; wherein the operations of the water distribution facility and the purification plant are controlled based on signals from the water quality monitors and the flow sensors.

It is also an effective method to provide the water distribution facility with a water quality monitor, a means for improving the water quality and a bypass passage for bypassing the water quality improving means to deliver the water to the small-pipe water distribution network so that, when the quality of water flowing from the water distribution main to the small-pipe water distribution network as measured by the water quality monitor is good, the water improving means is bypassed when supplying the water to the small-pipe water distribution network.

It is also possible to provide in a pipe line near the water quality monitor installed in the small-pipe water distribution network a pipe line and a drain valve for discharging the water and to open and close the drain valve according to the signal from the water quality monitor.

A tank for storing the water discharged from the drain valve may also be provided.

Further, it is possible to provide a pipe line for delivering the water near the water quality monitor installed in the small-pipe water distribution network to the water distribution facility, the water distribution reservoir or the purification plant and also a drain valve for opening and closing the pipe line, and to open and close the drain valve according to the signal from the water quality monitor.

It is also an effective method to provide a water purification facility near the water quality monitor installed in the small-pipe water distribution network, measure the water quality by the water quality monitor and, when the water quality deteriorates, pass the water through the water purification facility to deliver the purified water to downstream pipe lines.

Further, a water quality monitor may be installed near a consumer and a water quality indicator for displaying information on the water quality measured by the water quality monitor may be installed in the consumer's premises.

These and other features, objectives and advantages of the present invention may become apparent from the following description taken in conjunction with the accompanying drawings.

DESCRIPTION OF THE EMBODIMENTS

The water quality management system according to the present invention will be briefly explained as follows. Water quality monitors for measuring the quality of water in pipe lines are installed in small-pipe water distribution networks that reach consumers and branch from the distribution mains in the water supply network consisting of pipe lines running from the purification plant to the consumers' faucets. The water quality monitors transmit measurement signals to a water quality supervision center. Water distribution facilities for improving the water quality are installed at base points of the small-pipe water distribution networks branching from the distribution mains to the consumers. The water quality monitors for measuring the water quality are installed in the small-pipe water distribution networks to send their measured signals to the water distribution facilities and/or the water quality supervision center to control the operation of the water distribution facilities and the purification plant. Further, at the base points of the small-pipe water distribution networks branching from the distribution mains and running toward the consumers are installed water distribution facilities for improving the water quality. In the small-pipe water distribution networks there are installed water monitors for measuring the water quality and flow sensors for metering the flow of water running through the pipes. The signals of the water quality monitors and the flow sensors are transmitted to the water distribution facilities and/or the water quality supervision center to control the operation of the water distribution facilities and the purification plant. Water monitors are also provided at the water distribution facilities to measure the quality of water entering from the distribution mains and, when the water quality is good, the water is directly passed into the small-pipe water distribution networks, bypassing the water distribution facilities. Further, a drain valve is provided in a small distribution pipe near the water quality monitor and is opened and closed according to the signal of the water quality monitor. At this time, a tank for storing water from the drain valve may be provided. Further, the water from the drain valve may be returned to the water distribution facilities and/or the purification plant. It is also an effective method to install a purification facility near the water quality monitor. When the water quality measured by the water quality monitor deteriorates, the water is passed through the purification facility and the purified water is delivered to downstream pipes. It is also possible to provide a water quality monitor near a consumer and display information on water quality as measured by the water quality monitor on a water quality indicator installed in the consumer's premises.

Now, an example embodiment of the present invention will be described with reference to the accompanying drawings.

Figure 1:
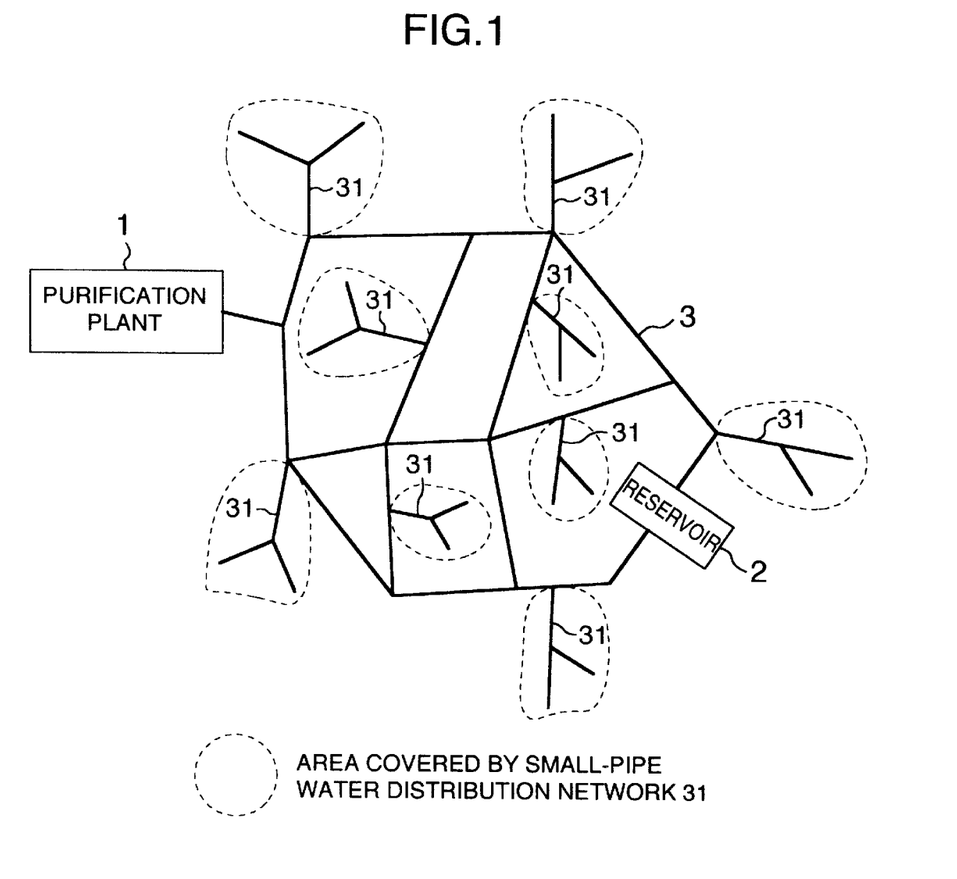
FIG. 1 is a system diagram showing an area covered by the water quality management system according to one embodiment of the present invention.

FIG. 1 is a schematic diagram showing an area covered by the system. The area covered by this invention, in large cities for example, is small-pipe water distribution networks 31 that supply water to housing complexes such as apartments, buildings and individual houses and which branches from a water distribution main pipe network 3 having distribution mains connected in loop and originating from a purification plant 1 or a large-scale water distribution reservoir 2. There may be a plurality of distribution plants 1 and distribution reservoirs 2. Simplified water supply systems in rural areas can be regarded as corresponding to the small-pipe water distribution network 31, and therefore can be handled in the similar way.

Figure 2:
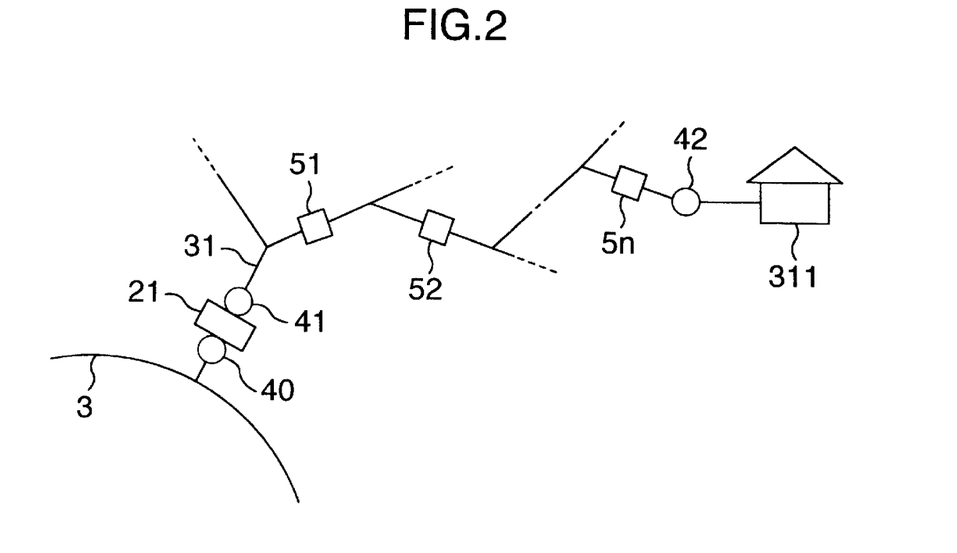
FIG. 2 is a system diagram showing the detail of an example of a small-pipe water distribution network of FIG. 1.

One example of the small-pipe water distribution network 31 is shown enlarged in FIG. 2. At the base point of the small-pipe water distribution network 31 there is installed a small-scale water distribution facility 21 which includes a chlorine addition facility and a filtering facility to manage the water quality at the small-pipe water distribution network 31. Upstream of the water distribution facility 21 is installed a water quality monitor 40 that measures residual chlorine, turbidity and color of the water flowing in from the water distribution main pipe network 3. Installed downstream (on the consumer's side) of the water distribution facility 21 is a water quality monitor 41 that measures the water quality of the water flowing out of the water distribution facility 21. Water quality information obtained from the water quality monitors 40 and 41 is transmitted, via wired communication means (not shown) such as telephone lines and wireless communication means (not shown) such as a satellite communication channel, to the water quality supervision center (not shown). The small-pipe water distribution network 31 branches out to reach a plurality of downstream ends or terminals, and water quality monitors 42 are also installed at downstream terminals 311 of the network which require the water a long time to reach and thus necessitate management of their water quality. The information on water quality measured by the water quality monitors 42 is sent to the water distribution facility 21 and/or the water quality supervision center by the same communication means as those used for the water quality monitors 40 and 41. Flow sensors 51, 52, . . . , 5n are installed between the nodes of a pipe line leading to the water quality monitor 42 to measure the flows of water flowing between the nodes and to send the information on the flows to the water distribution facility 21 and/or water quality supervision center via the communication means similar to those used for the water quality monitors 40 and 41. The water distribution facility 21 controls the amount of chlorine to be added and the filtering process according to the information from the water quality monitors 40 and 42. The time it takes for the water flowing out of the water distribution facility 21 to reach the downstream terminal 311 of the network is considered to be the sum of times $T_i$ required for the water to pass between the nodes, and is therefore can be expressed as $$T = \sum_{j=1}^{n} T_j = \sum_{j=1}^{n} (\pi r_j^2 L_j)/Q_j \quad (1)$$

where n indicates the number of pipes (small-pipes) provided with flow sensors 51, 52, . . . , 5n between water distribution facility 21 and downstream terminal 311, $T_j$ is the time taken by the water to pass between j-th node and (j+1)th node, $r_j$ is an inner diameter of a pipe between j-th node and (j+1)th node, $L_j$ is a length of a pipe between j-th node and (j+1)th node, and $Q_j$ is a flow of water flowing between j-th node and (j+1)th node. If it is assumed that a change of flow between the adjacent nodes in a time T is small, the residual chlorine concentration $C_D$ at the downstream terminal 311 can be regarded as $$C_D = C_0 \prod_{j=1}^{n} \exp(-k_j T_j) \quad (2)$$

where $k_j$ is an attenuation coefficient between j-th node and (j+1)th node which varies according to the pipe diameter, the water temperature and the material of pipe interior.

As $k_j$ is not determined at time of installation, it is estimated by monitoring the flow, water quality and water temperature for a certain period of time. Based on the estimated value of $k_j$, the water quality $C_0$ at the outlet of the water distribution facility 21 is controlled so that the value $C_D$ falls in a predetermined range ($C_{min}$, $C_{max}$) shown in equation (3).

$$C_{min} \prod_{j=1}^{n} \exp(k_j T_j) \leq C_0 \leq C_{max} \prod_{j=1}^{n} \exp(k_j T_j) \quad (3)$$

When the residual chlorine $C_d$ measured at the terminal of the network after the time T does not agree with $C_D$, $C_0$ is changed by only a small amount $\Delta C_0$ and then compared with the measured value $C_d$ after another time T. This is repeated until the measured value converges into a desired range. When a change in $Q_j$ during the time T cannot be ignored, variation patterns $Q_j(t)$ of $Q_j$ that were measured for a predetermined period are averaged for each day (when there are seasonal variations, a typical day is selected for each season) and the average is taken to represent the actual $Q_j$. At this time, $T_j$ can be expressed as $$T_j = \int_{t_j}^{t_{j+1}} \{(\pi r_j^2 L_j)/Q_j(t)\} dt \quad (4)$$

where $t_j$ is a time at which the water that has just come out of the water distribution facility 21 will reach the j-th node, and $t_{j+1}$ is a time at which the water that has just come out of the water distribution facility 21 will reach the (j+1)th node. For the pipe lines with nodes between which the water remains in a sufficiently short duration, the flow meter is not necessarily installed. Where the life patterns are uniform and the flow patterns are predictable, as in residential areas, too, the flow sensor is not necessary and it is needless to say that a flow may be determined by multiplying the average amount of water used (pattern) with the number of houses upstream of each pipe line and may be used as the actually measured flow. In a case where the water quality at the base point of the small-pipe water distribution network 31 can be controlled by the water management at other distribution reservoir or purification plant, it is possible to install only the water quality monitor 40 at the base point and omit the water distribution facility 21. Even when the water distribution facility 21 is not yet installed or cannot be installed due to the problem of the right-of-way, the water quality monitor 40 can of course be used as a system for informing the water quality supervision center of the water quality at a terminal of the network.

Figure 3:
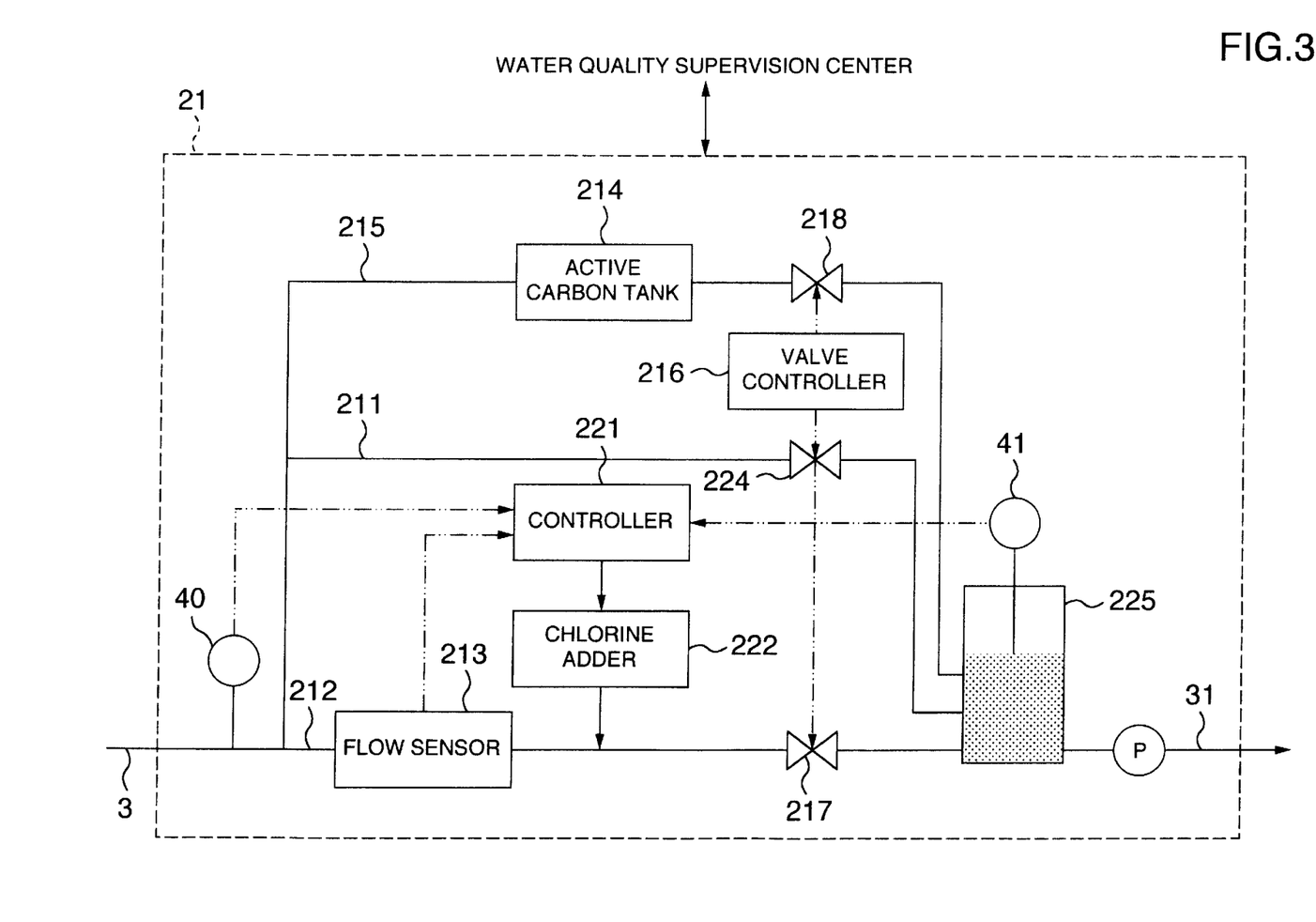
FIG. 3 is a schematic diagram showing an example configuration of a water distribution facility of FIG. 2.

FIG. 3 shows an example configuration of the water distribution facility 21. In the water distribution facility 21 the quality of water entering from the water distribution main pipe network 3 upstream of the water distribution facility 21 is measured by the water quality monitor 40. When, based on the residual chlorine concentration $C_{in}$ measured by the water quality monitor 40 at the inlet of the water distribution facility 21, the estimated residual chlorine concentration $C_D$ at the downstream terminal 311 as determined by the equation (2) falls within a predetermined range ($C_{min}$, $C_{max}$), a valve 224 on the bypass passage 211 is opened (valve 218 and valve 217 are closed) to supply water to the small-pipe water distribution network 31 through the bypass passage 211 and the distribution reservoir 225. When $C_D$ is equal to or less than $C_{min}$, the valve 217 is opened (valve 218 and valve 224 are closed) to supply water to the small-pipe water distribution network 31 via the chlorine addition passage 212 and the distribution reservoir 225. In the chlorine addition passage 212, the amount of chlorine to be added is determined by the equation (2) from the measured values of a flow sensor 213, the water quality monitor 40 on the inlet side and the water quality monitor 41 on the outlet side so that the water will have a target residual chlorine concentration. A controller 221 controls a chlorine adder 222 to add an appropriate amount of chlorine to the water. When $C_D$ is equal to or higher than $C_{max}$, the valve 218 is opened (valve 217 is closed) to flow water to a chlorine removing passage 215 which has an active carbon tank 214. At this time, the water of low residual chlorine concentration that has come out of the active carbon tank 214 and the water from the bypass passage 211 are mixed by a valve controller 216 adjusting the opening degrees of the valve 217 and the valve 218 so that the measured value of the water quality monitor 41 in the distribution reservoir 225 at the outlet will become a target residual chlorine concentration. The mixed water is then supplied to the small-pipe water distribution network 31. The valve 218 may be installed upstream of the active carbon tank. While the valve 217 is shown on the downstream side in the chlorine addition passage 212, it may be installed before or after the flow sensor 213 on the upstream side.

Figure 4:
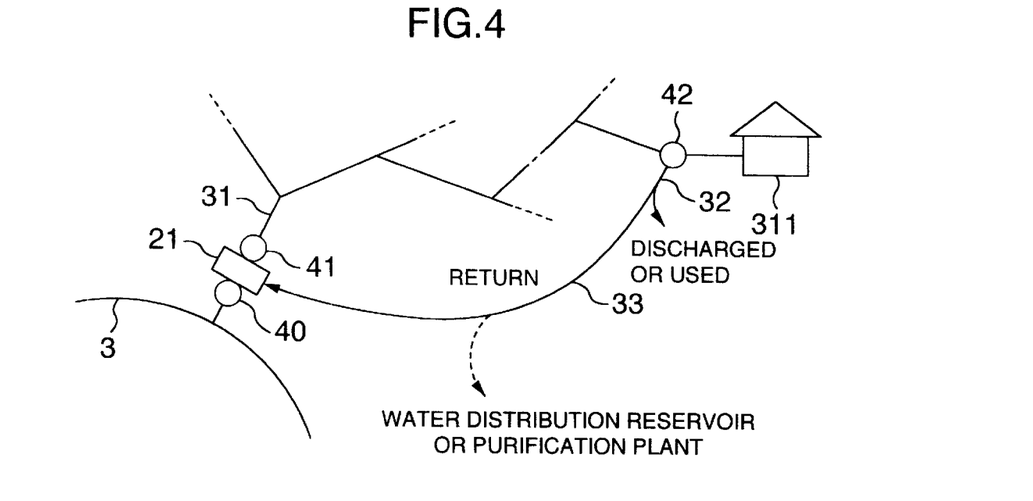
FIG. 4 is a system diagram showing another example of the small-pipe water distribution network of FIG. 1, which has a water return passage.

As shown in FIG. 4, the downstream terminal 311 is provided with a drainage function which, when the residual chlorine concentration $C_d$ measured by the water quality monitor 42 is equal to or less than $C_{min}$, discharges the water from the pipe 32 near the water quality monitor 42. When the residual chlorine concentration $C_d$ recovers to $C_{min}$ or higher, the discharge of water is stopped.

Figure 5:
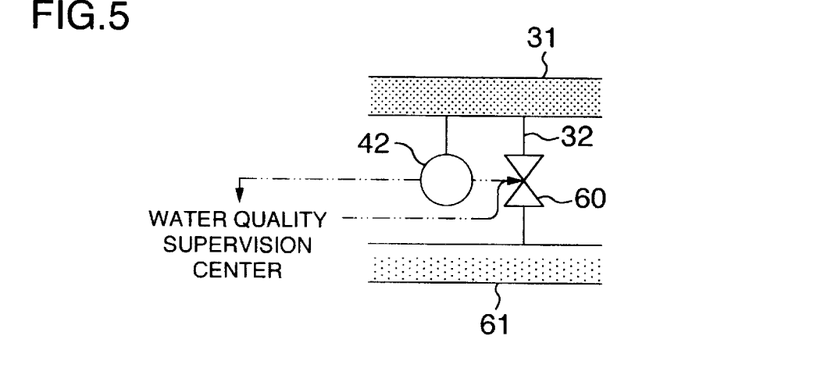
FIG. 5 is a schematic diagram showing another example configuration of the water return passage shown in FIG. 4.
Figure 6:
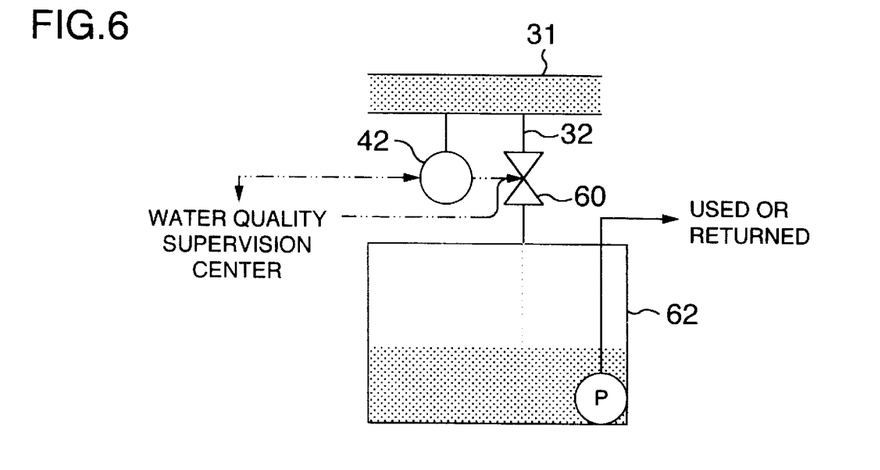
FIG. 6 is a schematic diagram showing still another example configuration of the water return passage shown in FIG. 4.
Figure 7:
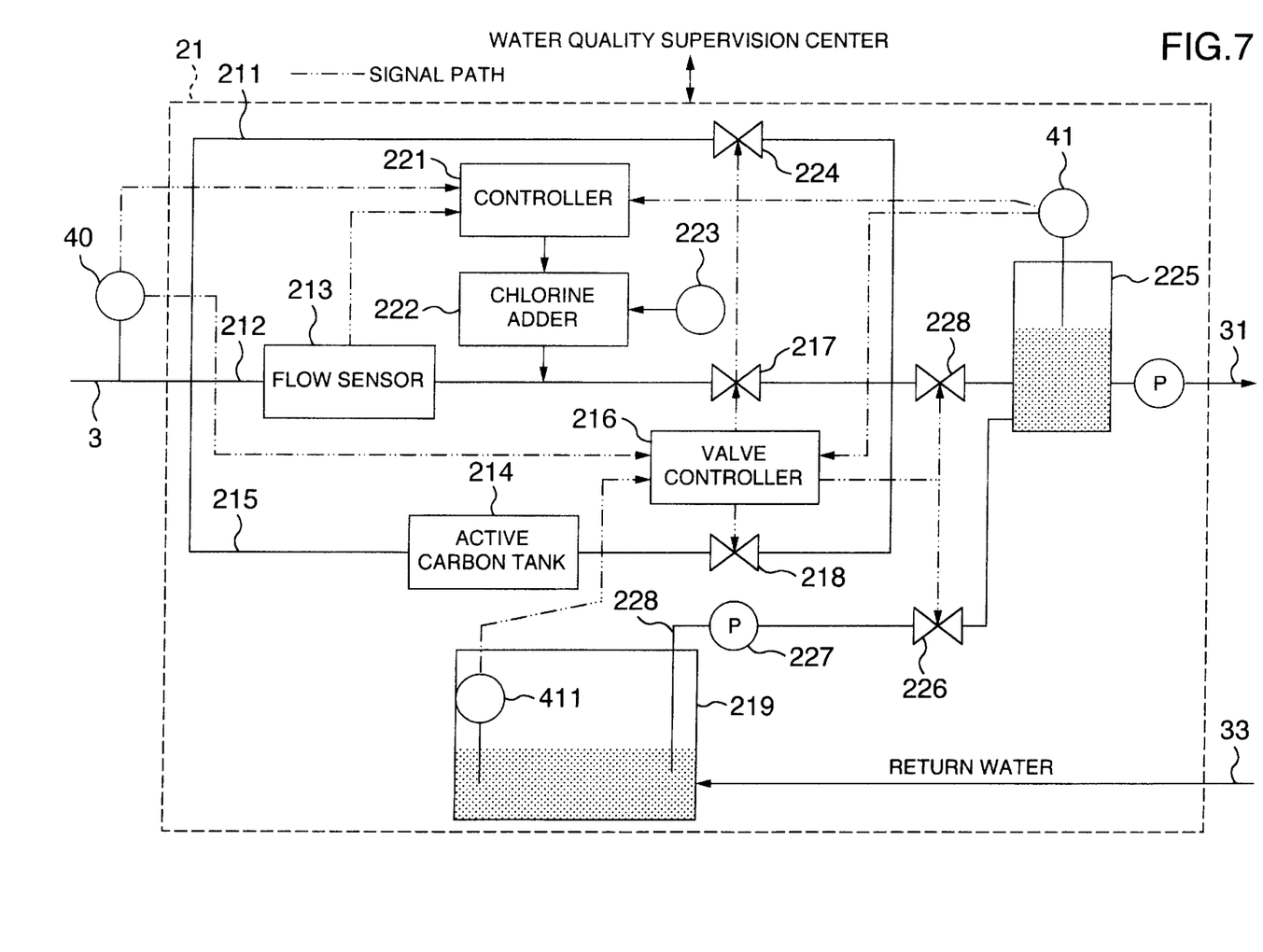
FIG. 7 is a schematic diagram showing another example configuration of the water distribution facility of FIG. 2.

As shown in FIG. 5, the water may be discharged into a drainage ditch 61 by opening a valve 60 in a drainage passage 32 provided near the water quality monitor 42. Alternatively, as shown in FIG. 6, the water may be stored in an existing water tank for fire fighting use or in a newly installed water tank 62 for use in spraying and toilet. Also, as shown in FIG. 4, a return passage 33 may be provided in order to return the water to the upstream water distribution facility 21, other distribution reservoir or purification plant for reuse. The valve 60 is opened and closed by the controller installed close to the valve or by the signal from the water quality supervision center that receives signals from a group of water quality monitors. In this case, as shown in FIG. 7, a storage tank 219 is provided to the water distribution facility 21 on the upstream side shown in FIG. 3 and the water in the storage tank 219 is returned from one end of a blending passage 228 having a pump 227 and a valve 226 to the distribution reservoir 225. A valve 228 is provided between the distribution reservoir 225 and a merging point on the downstream side of the bypass passage 211, the chlorine addition passage 212 and the chlorine removing passage 215. When the return water is to be blended, the opening degrees of the valve 228 and the valve 226 are adjusted to mix the water from the water distribution mains and the return water so that the residual chlorine concentration signal of the water quality monitor 41 falls in a predetermined range. In FIG. 7, reference number 223 represents a storage tank for hypochlorous acid, from which chlorine is injected through the chlorine adder into the water passing through the chlorine addition passage 212.

Figure 8:
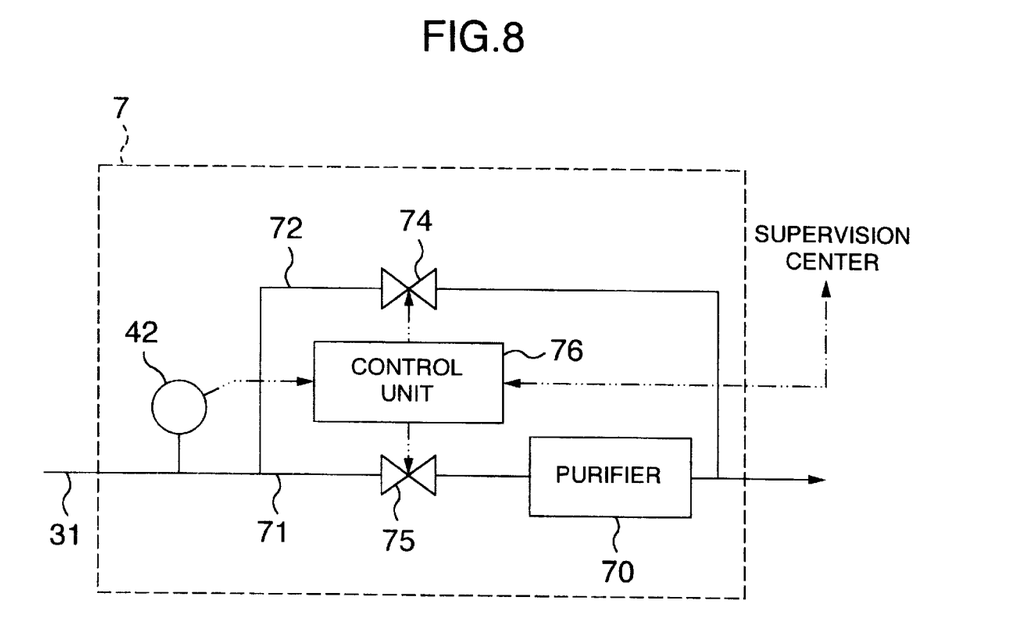
FIG. 8 is a schematic diagram showing an example configuration of a purification facility in the small-pipe water distribution network.

Further, when, as shown in FIG. 8, a purification facility 7 is provided downstream of the water quality monitor 42 and the water quality such as residual chlorine concentration, turbidity and chromaticity satisfies the criteria, the control unit 76 opens a valve 74 and closes a valve 75 to flow the water into the bypass passage 72 to supply the water to the downstream terminal. When the water quality measured by the water quality monitor 42 is equal to or less than the criteria, the control unit 76 closes the valve 74 and opens the valve 75 to flow the water into the passage 71 on a purifier 70 side where it is purified by a filter and active carbon before being delivered to the downstream terminal 311.

Figure 9:
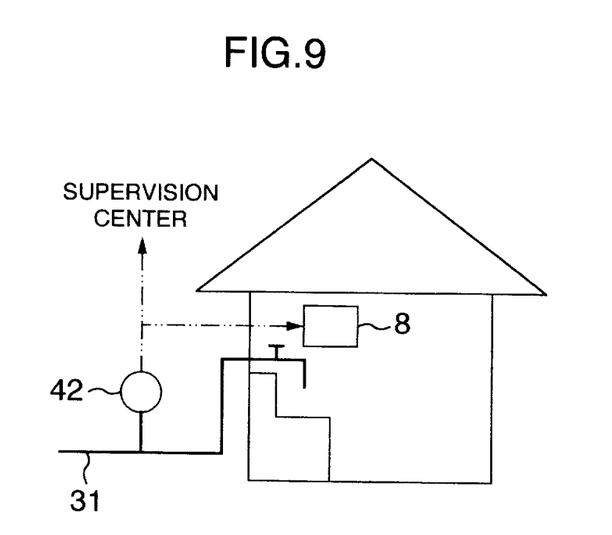
FIG. 9 is a schematic diagram showing a mode of use of the system near a consumer, the downstream end of the small-pipe water distribution network.

Further, as shown in FIG. 9, it is possible to install a water quality monitor 42 near the water pipe outlet to the consumer and display water quality information on an indoor water quality indicator 8 to present the consumer directly with a water quality level.

Although the controller for the valves in the above embodiment may be operated automatically only at the terminal of the small-pipe water distribution network, it is also possible to transmit signals of the water quality monitors and operation state signals to the water quality supervision center, which in turn may control the valves by sending control signals.

With this embodiment, because a reduction in the amount of residual chlorine in the pipe line between adjacent nodes is determined based on information from the water quality monitor and the flow sensor, it is possible to determine, based on the residual chlorine concentration at the base point of the small-pipe water distribution network, the residual chlorine concentration of the water that has flowed to the vicinity of a consumer near the terminal of the network where pipes of different diameters are combined. Further, because a water distribution facility is provided which is capable of adjusting the residual chlorine concentration at the base point of the small-pipe water distribution network, the residual chlorine concentration at the downstream terminal of the small-pipe water distribution network can be maintained at a predetermined value, thus making it possible to supply safe and tasty water to the consumers. Further, because the water can be discharged from the downstream terminal of the small-pipe water distribution network, the time it takes for the water from the water distribution facility to reach the downstream terminal can be shortened. As a result, the reduction in the amount of residual chlorine can be minimized, which in turn reduces the difference in the residual chlorine concentration between the water at the base point of the small-pipe water distribution network and the water at the terminal, thereby supplying consumers with tap water of uniform quality. Because the purification facility with a water quality monitor is installed close to the consumer, even when it has been partially not possible to maintain the water quality, it is possible to provide safe and tasty water to the consumer. The consumer is presented with water quality information displayed on a water quality indicator which is obtained by the water quality monitor. Thus, if the water quality should deteriorate, the consumer can discharge water before use or use the water for purposes for which the use of water with degraded quality poses no problem. After confirming the recovery of water quality, the consumer can use water for normal purposes.

Because the water quality monitor for measuring the quality of water in the pipe line is installed in the small-pipe water distribution network that branches from the water distribution main to the consumers and the quality of water flowing from the water distribution main to the small-pipe water distribution network is controlled or the signal of the water quality monitor is transmitted to the water quality supervision center to control the quality of the water flowing from the water distribution main to the small-pipe water distribution networks, the present invention has the advantage of being able to easily maintain the quality of water at the terminal consumers at an appropriate level.

Further, in a system that has a water distribution facility installed at the base point of the small-pipe water distribution network branching from the water distribution main to the consumers to improve the water quality and which also has a water quality monitor installed in the small-pipe water distribution network to measure the water quality, it is possible to control, based on the signal from the water quality monitor, the quality of water flowing from the water distribution facility to the small-pipe water distribution network.

Further, in a system which determines the reduction in the residual chlorine concentration between the nodes of the pipe line based on the information from the water quality monitor and the flow sensor, it is possible to determine, from the residual chlorine concentration at the base point of the small-pipe water distribution network, the residual chlorine concentration of the water that has come to the vicinity of the consumer near the terminal of the network where pipe lines of different diameters are combined.

Further, in a system which includes a water distribution facility installed at the base point of the small-pipe water distribution network and capable of adjusting the residual chlorine concentration, and a water quality monitor, a means for improving the water quality and a bypass passage for bypassing the water improving means and supplying the water directly to the small-pipe water distribution network, these latter three components being provided in the water distribution facility, and in which the quality of water entering from the water distribution main into the small-pipe water distribution network is measured and, when the water quality is good, the water improving means is bypassed when the water is delivered to the small-pipe water distribution network; it is possible to easily maintain the residual chlorine concentration at the downstream terminal of the small-pipe water distribution network at a predetermined value and thereby supply safe and tasty water to the consumers.

Further, in a system in which the water can be discharged from the downstream terminal of the small-pipe water distribution network or returned to the water distribution facility, the water distribution reservoir or the purification plant, the time it takes for the water from the water distribution facility to reach the downstream terminal can be shortened, which in turn minimizes the reduction in the amount of residual chlorine and also reduces the difference in the amount of residual chlorine between the water at the base point of the small-pipe water distribution network and the water at the terminal. As a result, water with uniform quality can be supplied to the consumers.

Further, by installing the purification facility with the water quality monitor close to the consumer, it is possible to supply safe and tasty water to the consumer even if it has been partly not possible to maintain the water quality. Informing the consumer of the water quality information from the water quality monitor by a water quality indicator offers an advantage of allowing the consumer to deal safely with the situation where the water quality deteriorates.

What is claimed is:

1. A water quality management system for managing the quality of water in a water supply network having water pipe lines running from a purification plant to consumers' faucets, comprising:
    a water distribution facility installed at a base point of a small-pipe water distribution network to improve the water quality, the small-pipe water distribution network branching from a water distribution main and running toward the consumers;
    water quality monitors installed in the small-pipe water distribution network to measure the quality of water; and
    flow sensors to measure the flow of water running through pipe lines of the small-pipe water distribution network;
    wherein means are provided for calculating an estimated value of residual chlorine concentration in the water reaching a vicinity of the consumers in said small-pipe water distribution network based on the quality of water measure by said water quality monitors and the flow of water measured by said flow sensors, and then controlling water quality at an outlet of said water distribution facility such that the residual chlorine concentration value at said vicinity of the consumers faucets is maintained within a predetermined range.

2. A water quality management system according to claim 1, further comprising:
    a water quality monitor installed near a consumer; and
    a water quality indicator installed in the consumer's premises for indicating information on the water quality measured by the water quality monitor near the consumer.

3. A water quality management system according to claim 1, wherein a traveling time of the water from said water distribution facility to said vicinity of consumers is calculated based on the flow of water measured by said flow sensors and a volume in the pipe lines from said water distribution facility to said vicinity of consumers, the residual chlorine concentration in the water at said vicinity of consumers is estimated based on said traveling time, and then water quality at the outlet of said water distribution facility is controlled such that the residual chlorine concentration value detected by said water quality monitors disposed at said vicinity of the consumers is maintained within a predetermined range.

4. A water quality management system for managing the quality of water in a water supply network having water pipe lines running from a purification plant to consumers' faucet, comprising:
    a water distribution facility installed at a base point of a small-pipe water distribution network to improve the water quality, the small-pipe water distribution network branching from a water distribution main and running toward the consumers; and
    water quality monitors installed in the small-pipe water distribution network to measure the quality of water;
    wherein the water distribution facility is provided with a water quality monitor, a means for improving the water quality and a bypass passage for bypassing the water quality improving means and delivering the water to the small-pipe water distribution network, and bypassing means operable such that the quality of the water entering from the water distribution main into the small-pipe water distribution network is measured by the water quality distribution facility monitor and, when the water quality is good, the water quality improving means is bypassed when the water is delivered to the small-pipe water distribution network.

5. A water quality management system for managing the quality of water in a water supply network having water pipe lines running from a purification plant to consumers' faucet, comprising:
    water quality monitors installed in a small-pipe water distribution network to measure the quality of water in pipe lines, the small-pipe water distribution network branching from a water distribution main and running toward the consumers;
    wherein the quality of water flowing from the water distribution main to the small-pipe water distribution network is controlled based on signals from the water quality monitors wherein a pipe line and a drain valve for discharging the water are installed near the water quality monitors provided in the small-pipe water distribution network, and means for opening and closing the drain valve according to signals from the water quality monitors.

6. A water quality management system according to claim 5, further comprising:
   a tank provided for storing the water discharged from the drain valve.

7. A water quality management system for managing the quality of water in a water supply network having water pipe lines running from a purification plant to consumers' faucets, comprising:
   water quality monitors installed in a small-pipe water distribution network to measure the quality of water in pipe lines, the small-pipe water distribution network branching from a water distribution main and running toward the consumers;
   wherein the quality of water flowing from the water distribution main to the small-pipe water distribution network is controlled based on signals from the water quality monitors further comprising:
   a pipe line for delivering the water near the water quality monitors installed in the small-pipe water distribution network to a water distribution facility, a water distribution reservoir or the purification plant; and
   a drain valve for opening and closing the pipe line;
   and means for opening and closing the drain valve according to signals from the water quality monitors.

* * * * *